US012204520B2

(12) United States Patent
Fredette

(10) Patent No.: US 12,204,520 B2
(45) Date of Patent: Jan. 21, 2025

(54) CONTROLLING LOCK ACCESS OPERATIONS

(71) Applicant: Dell Products L.P., Round Rock, TX (US)

(72) Inventor: Matthew H. Fredette, Belmont, MA (US)

(73) Assignee: Dell Products L.P., Round Rock, TX (US)

( * ) Notice: Subject to any disclaimer, the term of this patent is extended or adjusted under 35 U.S.C. 154(b) by 108 days.

(21) Appl. No.: 18/104,404

(22) Filed: Feb. 1, 2023

(65) Prior Publication Data

US 2024/0256517 A1 Aug. 1, 2024

(51) Int. Cl.
*G06F 16/23* (2019.01)
(52) U.S. Cl.
CPC ...... *G06F 16/2343* (2019.01); *G06F 16/2365* (2019.01)

(58) Field of Classification Search
CPC .................................................. G06F 16/2343
See application file for complete search history.

(56) References Cited

U.S. PATENT DOCUMENTS

| | | | |
|---|---|---|---|
| 9,460,102 B1* | 10/2016 | Bono | G06F 16/1748 |
| 2006/0161738 A1* | 7/2006 | Saha | G06F 9/526 |
| | | | 711/150 |
| 2008/0098180 A1* | 4/2008 | Larson | G06F 15/16 |
| | | | 711/150 |
| 2022/0291971 A1* | 9/2022 | Shveidel | G06F 9/542 |

* cited by examiner

*Primary Examiner* — Van H Oberly
(74) *Attorney, Agent, or Firm* — Krishnendu Gupta; Nikhil Patel

(57) ABSTRACT

One or more aspects of the present disclosure relate to controlling lock access operations. In embodiments, an instruction corresponding to a program by a processor of a plurality of processors in a computing device is received. In addition, a lock corresponding to a target resource of the instruction is obtained based on a contended or uncontended state of the lock. Further, the instruction is executed contemporaneously with obtaining the lock.

18 Claims, 4 Drawing Sheets

CONTROLLING LOCK ACCESS OPERATIONS

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to controlling lock access operations. In embodiments, an instruction corresponding to a program by a processor of a plurality of processors in a computing device is received. In addition, a lock corresponding to a target resource of the instruction is obtained based on a contended or uncontended state of the lock. Further, the instruction is executed contemporaneously with obtaining the lock.

In embodiments, the computing device can be a storage array.

In embodiments, one or more locks can be established for each computing device resource.

In embodiments, the processor's accesses to each lock can be tracked in a data structure local to the processor.

In embodiments, one or more of the processor's access patterns corresponding to each lock record can be identified in the data structure.

In embodiments, each lock with access metrics above a threshold can be categorized as likely being in the contended state. Additionally, each lock with access metrics below the threshold can be categorized as likely being in the uncontended state.

In embodiments, a read-to-test operation to obtain the lock can be performed if the lock is in the contended state.

In embodiments, a read-for-ownership operation to obtain the lock can be performed if the lock is uncontended.

In embodiments, the data structure can be established as a Bloom filter. Further, total and contended access counts can be maintained for each lock accessed by the processor using the Bloom filter.

In embodiments, each lock accessed by the processor can be categorized as being in the contended or uncontended state as a function of the total and contended access counts.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

Business entities like banks can use a distributed storage system that includes a storage array with several linked storage devices (e.g., hard-disk drives (HDDs) or solid-state drives (SSDs)). Additionally, the storage array can have a multi-processor architecture that processes input/output (IO) messages, including data storage service requests. For example, bank employees or applications can use the storage array to centrally create, read, update, and delete bank-related data. In addition, the distributed storage system can include a host machine that includes a server. The server can host one or more bank applications that create, read, update, or delete data using the storage array.

Suppose, for example, a bank customer deposits funds into a checking account. Then, a bank application running on the host machine's server can create a first input/output (IO) message to update the customer's checking account balance in the storage array. Additionally, suppose the customer transfers funds from a savings account to the checking account. Then, the bank application can create a second IO message to request the storage array to reflect the transfer in the storage array. Further, the server can contemporaneously transmit the first and second IO messages to the storage array.

Further, the storage array can process the first and second IO messages using first and second processors. Additionally, the storage array can pre-cache the customer's checking account data in a portion of shared memory. To update the checking account data, the first and second processors can contemporaneously request access to the shared memory portion. However, the storage array can include a locking mechanism that prevents processors from accessing shared memory portions simultaneously.

In some architectures, the storage array can use spinlocks that enable orderly access to a shared resource, like the shared memory portion. Specifically, each shared memory portion can have a corresponding spinlock that identifies whether the shared memory portion is in use. For example, the spinlock can provide the shared memory portion with a "locked" status if it is in use or an "unlocked" status if it is not in use.

Accordingly, suppose the first processor accesses the shared memory portion to update the customer's checking account data with the fund deposit. Additionally, suppose the second processor requests access to the shared memory portion while the first is performing the update. Then, the spinlock can notify the second processor that the shared memory portion is locked, preventing the second processor from accessing the shared memory portion.

One or more aspects of the present disclosure relate to controlling lock access operations. For example, embodiments of the present disclosure request types for a lock based on the lock's status, as described in greater detail below.

Figure 1:
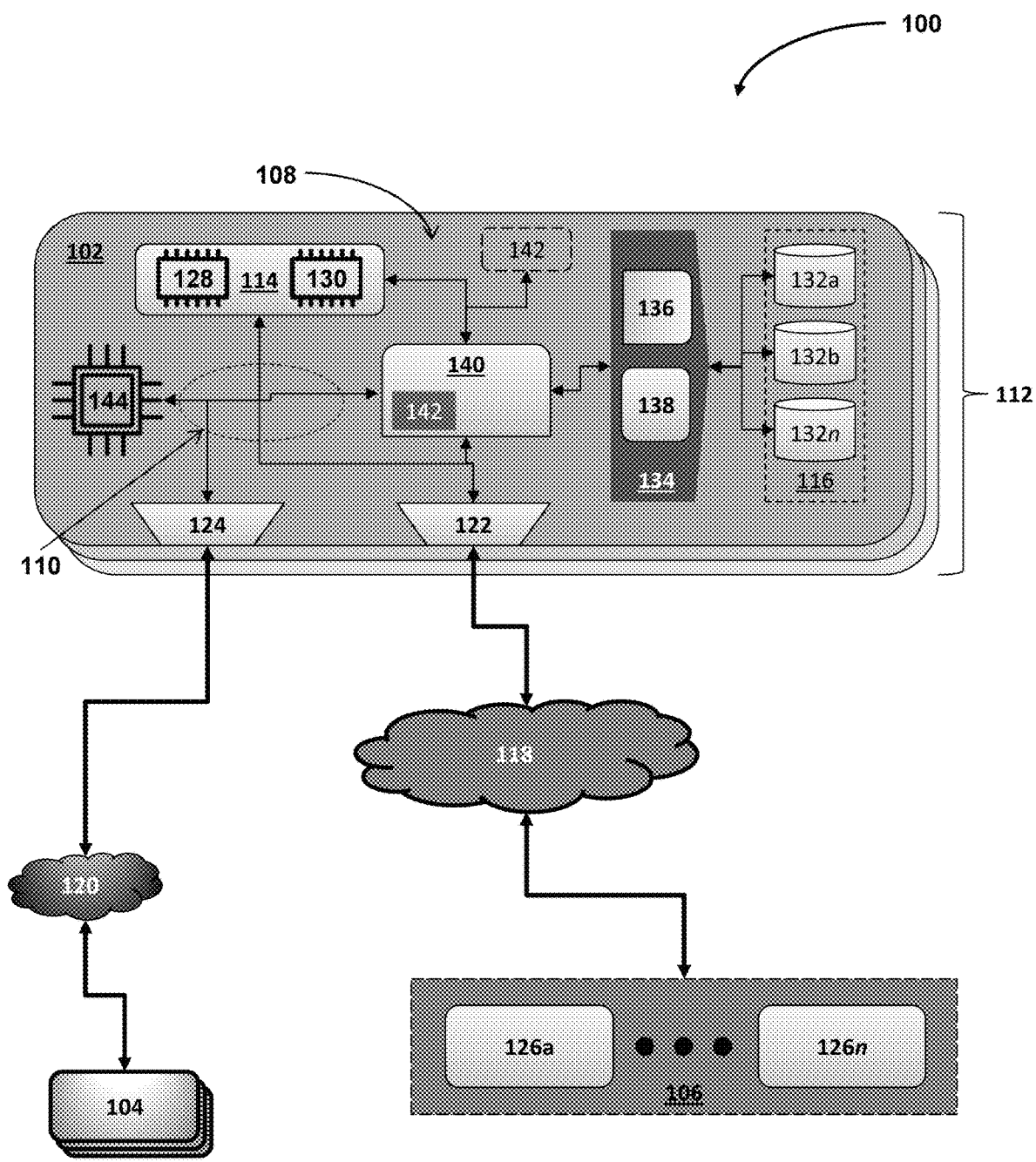
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112 that includes the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that controls access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
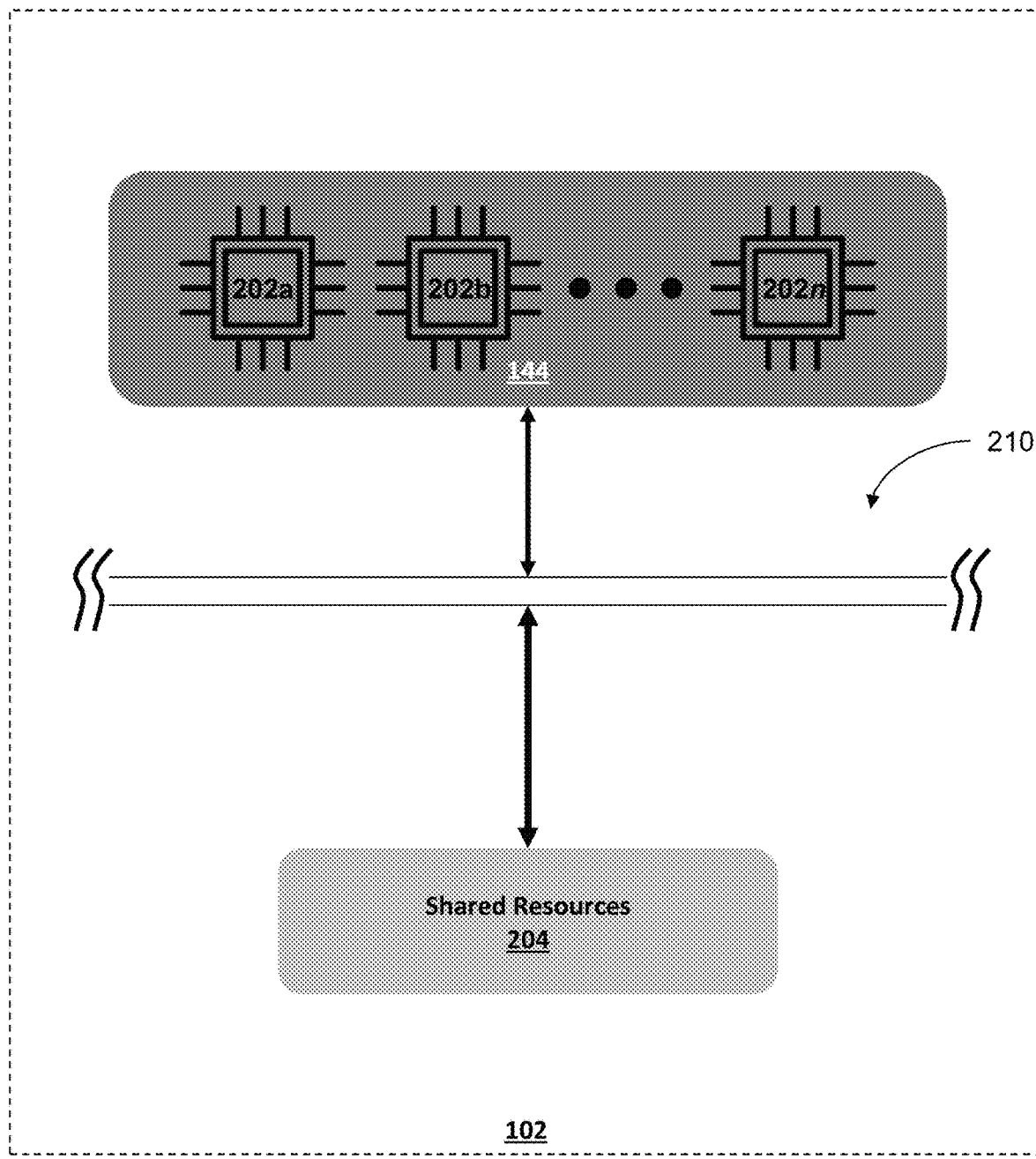
FIG. 2 is a block diagram of a multi-processor system in accordance with embodiments of the present disclosure.

Regarding FIG. 2, the processors 144 of FIG. 2 can have a multi-processor architecture that includes processors 202a-n. In addition, the processors 202a-n can include individual CPUs or microprocessors configured to execute instructions in parallel. In embodiments, the processors 202*a-n* can compete for shared resources 204, e.g., memory (e.g., GM 128 of FIG. 1) and one or more IO components (e.g., components 108 of FIG. 1). Further, the processors 202*a-n* can obtain access to the shared resources 204 via a bus 210 that is substantially similar to the communication channels 110 of FIG. 1. For example, the bus 210 provides channels of communication between the storage array's components 108 and memory 128.

Figure 3:
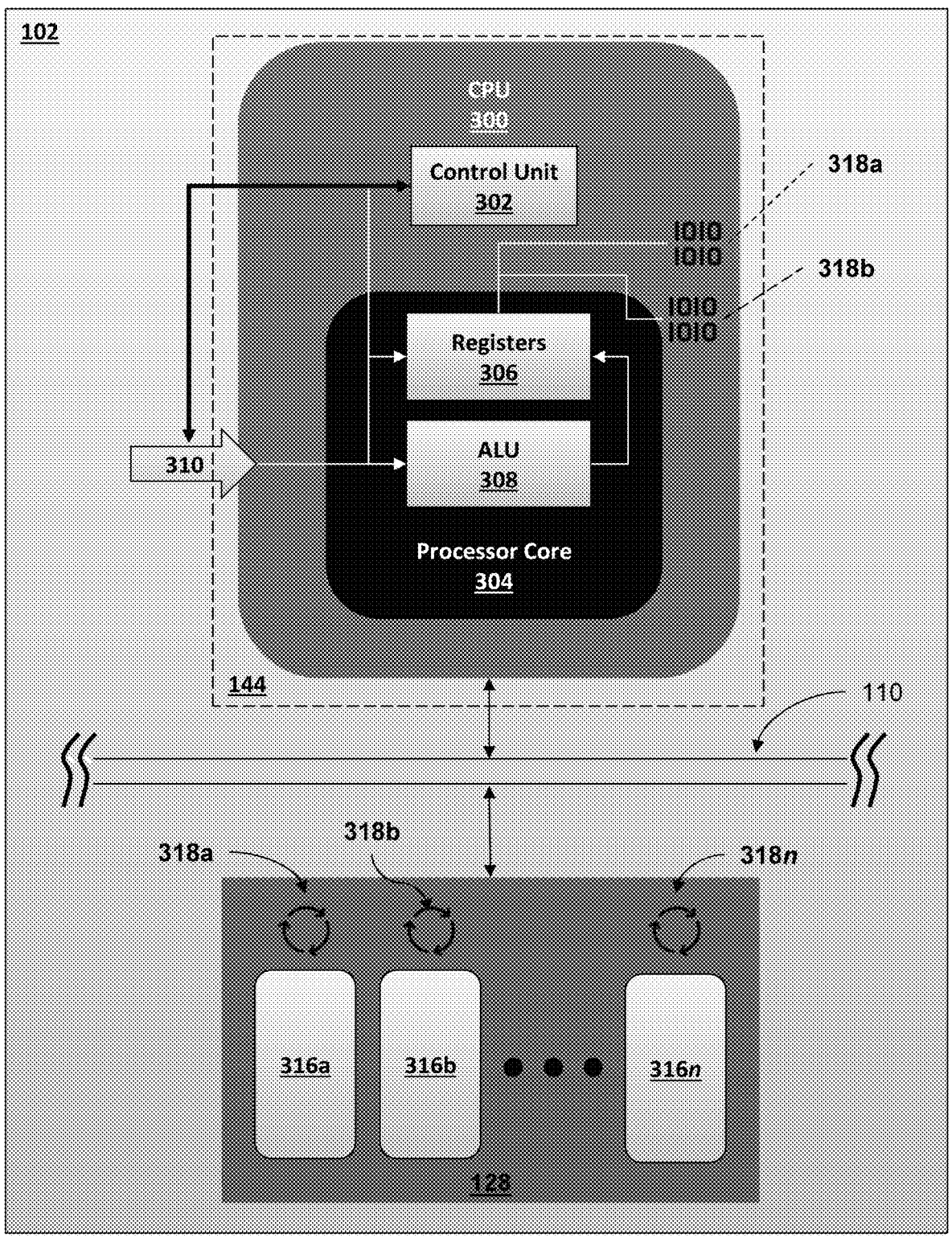
FIG. 3 is a block diagram of a processor in accordance with embodiments of the present disclosure.

Regarding FIG. 3, a storage array 102 can include a multi-processor system 144 that includes several processors (e.g., processors 202*a-n* of FIG. 2). In embodiments, at least one of the processors can include a CPU 300 configured instructions 310 from an IO component (e.g., one of the components 108 of FIG. 1) to satisfy, e.g., a read/write request of an IO message.

In embodiments, a host machine (e.g., machine 126*a* of FIG. 1) can run a server that hosts a business application that can issue IO messages to the storage array 102 with a create, update, read, or delete request (data request). Further, the storage array's host adapter (e.g., HA 122 of FIG. 1) can receive the IO message and direct it to one of the array's IO components for further processing. For example, the HA 122 can direct the IO message to a data services component (e.g., EDS 140 of FIG. 1) that can issue instructions to the CPU 300 to satisfy the IO message's corresponding data request.

In embodiments, the CPU 300 can include a processor core 304 with logic, hardware, and circuitry that process instructions sent to the CPU 300. Specifically, the processor core 304 can include CPU memory, e.g., registers 306 that accept, store, and transfer data and instructions used by the CPU 300. Additionally, the processor core 304 can include an arithmetic logical unit (ALU) 308, a combinational digital electronic circuit that performs arithmetic and bitwise operations on integer binary numbers.

In embodiments, the CPU 300 can also include a control unit 302 that generates timing and control (TC) signals from instructions sent to the CPU 300. The TC signals can direct data flow between the CPU 300 and one or more shared resources (e.g., GM 128 of FIG. 1). Specifically, the TC signals can inform the CPU's arithmetic logical unit (ALU) 308 and the shared resources how to respond to instructions sent to the CPU 300. For example, the TC signals can request access to a shared resource via its corresponding lock (e.g., a spinlock 318*a-n*).

In embodiments, the CPU 300 can receive instructions 310 to update data stored in a memory segment (e.g., cache slot) of shared memory 128, including several memory segments 316*a-n*. Further, the memory segments 316*a-n* can include corresponding spinlocks 318*a-n* that control access to data stored by their respective memory segments 316*a-n*. For example, the spinlocks 318*a-n* can ensure that only one processor is accessing their corresponding memory segments 316*a-n* at any given time. Accordingly, if a processor requests access to a memory segment while another is already accessing it, the spinlock can "lock" the memory segment to prevent processors from accessing it simultaneously.

Using current naïve techniques, a processor that fails to gain access to a shared resource waits for some time before re-attempting access. Specifically, the current naïve techniques cause the processor to enter into a finite loop, continually testing the spinlock until it gains access. However, the current naïve techniques can cause severe shared resource contention events as the number of processors competing for access to the shared resource increases.

In embodiments, the control unit 302 can include a read-to-test or a read-for-ownership operation in a first TC signal to a shared resource based on a predicted contended or uncontended state of the shared resource. Specifically, a contended state corresponds to the likelihood that another processor is using the shared resource. In contrast, an uncontended state corresponds to the likelihood that another processor is not using the shared resource.

In embodiments, the control unit 302 can maintain a data structure in the CPU's local registers 306 that tracks access to shared resources (e.g., shared memory segments 316*a-n*) and their corresponding spinlock states (e.g., "locked" or "unlocked"). For example, the control unit 302 can maintain the data structure like an active Bloom filter 318*a* in the registers 306. In addition, each position of the Bloom filters can be configured to represent a distinct spinlock of the spinlocks 318*a-n* using a unique hash value for each spinlock 318*a-n*. Further, each spinlock position can maintain a total count of instructions requesting access to the spinlock's corresponding shared resource. Additionally, each spinlock position can maintain a count of occurrences the spinlock is "locked," e.g., a contended count.

In embodiments, the CPU 300 can receive an instruction to access memory segment 316*a* of the shared memory 128. In response to receiving the instruction, the control unit 302 can query the active Bloom filter 318*a* to determine whether the memory segment's corresponding spinlock 318*a* is likely locked (i.e., "contended") or unlocked (i.e., "uncontended"). Specifically, the control unit 302 can obtain the total count and contended count from the position in the bloom filter 318*a* corresponding to the spinlock 318*a*. Further, the control unit 302 can issue a TC signal to the ALU 308, instructing it to return a predicted contention value using the total count and contended count. For instance, the ALU 308 can process the total and contended counts using the following equation, EQ. 1.

$$\text{Predicted Contention Value} = \frac{\text{contended count}}{\text{total count}}$$

Further, the control unit 302 can compare the predicted contention value with a threshold. Based on the comparison, the control unit 302 can issue a TC signal for the shared memory segment 316*a*. For example, suppose the predicted contention value exceeds the threshold. In that case, the control unit 302 can determine that the spinlock 318*a* is "locked" and include a "read-to-test" operation in the TC signal. Suppose, however, the predicted contention value is less than the threshold. Then, the control unit 302 can determine that the spinlock 318*b* is "unlocked" and include a "read-for-ownership" operation in the TC signal.

In embodiments, the control unit 302 can refresh (e.g., clear) the active Bloom filter 318*a*. For example, IO workload patterns can change over time resulting in changes to the likelihood that a spinlock is locked or unlocked. Thus, the control unit 302 can enable a backup Bloom filter 318*b*, copy the active Bloom filter 318*a* into the backup 318*b*, and clear the active Bloom filter 318*a*. For instance, the control unit 302 can enable the backup Bloom filter 318*b* for a predetermined duration or a dynamically determined duration based on the IO workload patterns. While the Backup bloom filter 318*b* is enabled, the control unit 302 updates the total and contended counts of each spinlock position of the active Bloom filter 318*a*.

In embodiments, the CPU 300 can receive instructions to access one or more of the shared memory segments 316*a-n* while the backup Bloom filter 318*b* is enabled. In such circumstances, the control unit 302 selects one of the filters 318a-b to predict whether corresponding spinlocks 318a-n are locked or unlocked. Accordingly, the control unit 302 can select the Bloom filter having a greater total count in the position corresponding to a shared memory segment's corresponding spinlock. Furthermore, after the predetermined or dynamically determined duration expires, the control unit 302 can disable the Backup bloom filter 318b.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 4:
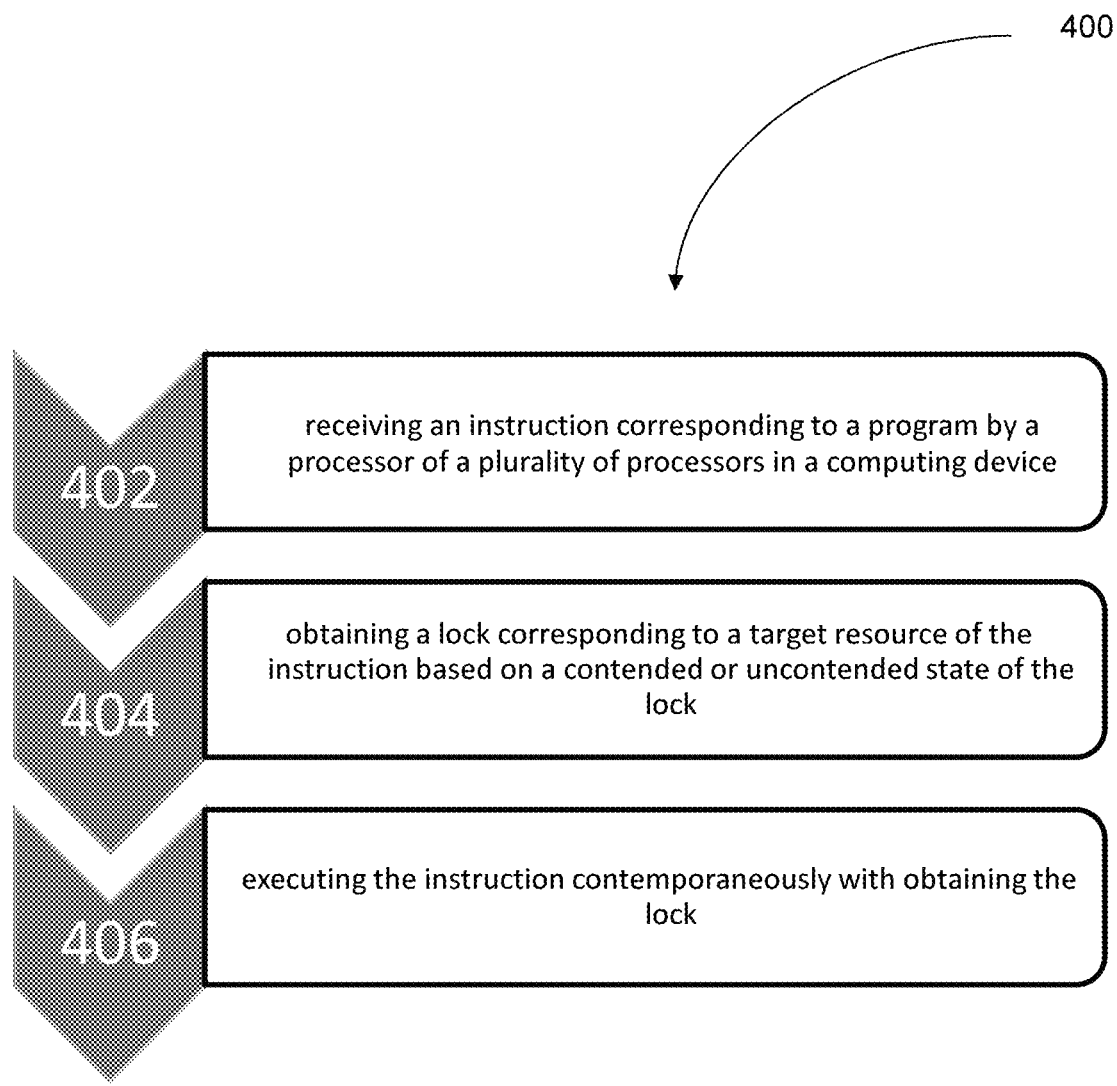
FIG. 4 is a flow diagram of a method for controlling lock access operations per embodiments of the present disclosure.

Regarding FIG. 4, a method 400 relates to controlling lock access operations. In embodiments, the controller 142 of FIG. 1 can perform all or a subset of operations corresponding to method 400. For example, the method 400, at 402, can include receiving an instruction corresponding to a program by a processor of a plurality of processors in a computing device. Additionally, at 404, the method 400 can include obtaining a lock corresponding to a target resource of the instruction based on a contended or uncontended state of the lock. Further, the method 400, at 406, can include executing the instruction contemporaneously with obtaining the lock.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data.

Additionally, a computer can receive data from or transfer data to one or more mass storage device(s) for storing data (e.g., magnetic, magneto-optical disks, solid-state drives (SSDs), or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
receiving an instruction corresponding to a program by a processor of a plurality of processors in a computing device;
obtaining a lock corresponding to a target resource of the instruction based on a contended or uncontended state of the lock, wherein obtaining the lock includes performing a read-to-test operation to obtain the lock if the lock is in the contended state; and
executing the instruction contemporaneously with obtaining the lock.

2. The method of claim 1, wherein the computing device is a storage array.

3. The method of claim 1, further comprising:
establishing one or more locks for each resource of a computing device.

4. The method of claim 1, further comprising:
local to the processor, tracking the processor's accesses to each lock using a data structure.

5. The method of claim 4, further comprising:
identifying one or more of the processor's access patterns corresponding to each lock record in the data structure.

6. The method of claim 5, further comprising:
categorizing each lock with access metrics above a threshold as likely being in the contended state; and
categorizing each lock with access metrics below the threshold as likely being in the uncontended state.

7. The method of claim 6, further comprising:
performing a read-for-ownership operation to obtain the lock if the lock is uncontended.

8. The method of claim 6, further comprising:
establishing the data structure as a Bloom filter; and
for each lock accessed by the processor, maintaining total and contended access counts using the Bloom filter.

9. The method of claim 8, further comprising:
categorizing each lock accessed by the processor as being in the contended or uncontended state as a function of the total and contended access counts.

10. An apparatus with a memory and processor, the apparatus configured to:
receive an instruction corresponding to a program by a processor of a plurality of processors in a computing device;
obtain a lock corresponding to a target resource of the instruction based on a contended or uncontended state of the lock, wherein obtaining the lock includes performing a read-to-test operation to obtain the lock if the lock is in the contended state; and
execute the instruction contemporaneously with obtaining the lock.

11. The apparatus of claim 10, wherein the computing device is a storage array.

12. The apparatus of claim 10, further configured to:
establish one or more locks for each resource of a computing device.

13. The apparatus of claim 10, further configured to:
local to the processor, track the processor's access to each lock using a data structure.

14. The apparatus of claim 13, further configured to:
identify one or more of the processor's access patterns corresponding to each lock record in the data structure.

15. The apparatus of claim 14, further configured to:
categorize each lock with access metrics above a threshold as likely being in the contended state; and
categorize each lock with access metrics below the threshold as likely being in the uncontended state.

16. The apparatus of claim 15, further configured to:
perform a read-for-ownership operation to obtain the lock if the lock is uncontended.

17. The apparatus of claim 15, further configured to:
establish the data structure as a Bloom filter; and
for each lock accessed by the processor, maintain total and contended access counts using the Bloom filter.

18. The apparatus of claim 17, further configured to:
categorize each lock accessed by the processor as being in the contended or uncontended state as a function of the total and contended access counts.

* * * * *